US009288094B2

(12) United States Patent
Arambepola et al.

(10) Patent No.: US 9,288,094 B2
(45) Date of Patent: Mar. 15, 2016

(54) ADAPTIVE CHANNEL PREDICTION AND MITIGATING INTERFERENCE IN OFDM SYSTEMS

(71) Applicant: Intel Corporation, Santa Clara, CA (US)

(72) Inventors: Bernard Arambepola, Enfield (GB); Parveen K. Shukla, Nottingham (GB); Thushara Hewavithana, Hatfield (GB)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 14/133,123

(22) Filed: Dec. 18, 2013

(65) Prior Publication Data

US 2015/0172088 A1 Jun. 18, 2015

(51) Int. Cl.
*H04L 27/26* (2006.01)
*H04L 25/03* (2006.01)

(52) U.S. Cl.
CPC ...... *H04L 27/2646* (2013.01); *H04L 25/03343* (2013.01); *H04L 27/2613* (2013.01)

(58) Field of Classification Search
CPC .............. H04B 1/10; H04B 1/38; H04B 1/40; H04B 3/06; H04L 25/03; H04L 25/03006; H04L 25/03178; H04L 25/03343; H04L 25/03824; H04L 25/03878; H04L 25/03987; H04L 27/2613; H04L 27/2626; H04L 27/2628; H04L 27/2634; H04L 27/2637; H04L 27/2643; H04L 27/2646; H04L 27/2647; H04L 27/2666
USPC ......... 375/219, 220, 222, 223, 257, 259–262, 375/265, 285, 346, 348; 370/206, 208, 278, 370/280, 282
See application file for complete search history.

(56) References Cited

U.S. PATENT DOCUMENTS

| 2005/0271151 | A1* | 12/2005 | Cho et al. ...................... 375/260 |
| 2009/0059781 | A1* | 3/2009 | Tseng et al. .................. 370/201 |
| 2012/0183107 | A1* | 7/2012 | Zhu et al. ...................... 375/348 |
| 2012/0327992 | A1* | 12/2012 | Anton ........................... 375/227 |

OTHER PUBLICATIONS

Lin, et al., "A Filterbank Approach to Window Designs for Multicarrier Systems," IEEE Circuits and Systems Magazine, First Quarter 2007, pp. 19-30.
Data-Over-Cable Service Interface Specifications DOCSIS 3.1, Physical Layer Specification CM-SP-PHYv3.1-I01-131029, CableLabs, Oct. 29, 2013, 220 pages.
ITU-T G.992.1, Series G: Transmission Systems and Media, Digital Systems and Networks, Asymmetric digital subscriber line (ADSL) transceivers, International Telecommunication Union, Jun. 1999, 256 pages.
ITU-T G.992.3, Series G: Transmission Systems and Media, Digital Systems and Networks, Asymmetric digital subscriber line transceivers 2 (ADSL2), International Telecommunication Union, Jul. 2012, 312 pages.

* cited by examiner

*Primary Examiner* — Young T Tse
(74) *Attorney, Agent, or Firm* — Grossman, Tucker, Perreault & Pfleger, PLLC

(57) ABSTRACT

One embodiment provides an apparatus. The apparatus includes an optimization module configured to determine a guard interval remainder based, at least in part on a comparison of an allowable microreflection interference level and an actual microreflection interference level; and a windowing module configured to window an OFDM (orthogonal frequency division multiplexed) symbol utilizing the guard interval remainder. The apparatus may further include a channel estimator module configured to determine a predicted channel frequency response based, at least in part, on a probing symbol; and a pre-equalizer module configured to pre-equalize the OFDM symbol based, at least in part, on the predicted channel frequency response.

20 Claims, 7 Drawing Sheets

ADAPTIVE CHANNEL PREDICTION AND MITIGATING INTERFERENCE IN OFDM SYSTEMS

FIELD

The present disclosure relates to OFDM (orthogonal frequency division multiplexing) systems, and, more particularly, to adaptive channel prediction and/or mitigating interference in OFDM systems.

BACKGROUND

In some communication systems, a receiver (and/or a transmitter) may be coupled to a plurality of transmitting (and/or receiving) devices via a shared communication network. The communication network may be shared, for example, by using OFDMA (orthogonal frequency division multiple access), a multi-user variant of OFDM (orthogonal frequency division multiplexing). In OFDM, digital data, that may be encoded, is modulated onto a plurality of orthogonal subcarrier frequencies ("subcarriers"). Modulation schemes may include, for example, QAM (quadrature amplitude modulation) and/or PSK (phase shift keying). Subcarriers may further include so-called "pilots" that are subcarriers modulated with known data that may then be used for determining channel characteristics.

In OFDMA, each client device of a plurality of client devices may utilize (e.g., may be assigned) a subset of the subcarriers. The client device (transmitting or receiving) may then be configured to modulate user data onto the subset of subcarriers and transform the modulated subcarriers (and pilots) into the time domain (using, e.g., an inverse fast Fourier transform) to produce an OFDM symbol. The OFDM symbol may then be converted from digital to analog, modulated onto an RF carrier (for example) to produce an analog signal and transmitted along a channel to a receiving device. The receiving device may be configured to demodulate the analog signal and digitize the demodulated analog signal (via, e.g., an analog to digital converter) to recover the OFDM symbol. The OFDM symbol may then be further processed to recover the user data.

The analog signal may be modified during its travel along the channel due to channel characteristics that may change over time. Channel characteristics may include channel frequency response and/or channel impulse response. In a multi-user system, channel characteristics may vary across channels since a first communication channel that couples a first client device to a head-end may be different from a second communication channel that couples a second client device to the head-end.

For example, in a broadband cable system, a cable modem termination system ("head-end") is configured to provide television, voice and network access to a plurality of cable modems over a hybrid fiber coaxial cable network. A configuration of each channel coupling a respective cable modem to the head-end may vary across channels. Thus, channel characteristics may vary across channels. Channel characteristics may be estimated using periodic probing symbols. Each channel characteristic estimate may be applied to data-carrying OFDM symbols until a next probing symbol is received and the channel characteristic estimate is updated. The probing symbols may be transmitted relatively far apart, e.g., at intervals ranging from about one second to about thirty seconds. Thus, several data-carrying OFDM symbols may be transmitted (and received) between probing symbols.

The channel characteristics are assumed to be static, i.e., to remain constant between probing symbols. However, channel characteristics may actually change over the time interval between probing symbols. Further, small timing drifts may appear as changes in the channel frequency response. Thus, the assumption that the channel characteristics are fixed between probing symbols may result in a loss of performance as equalization may be performed on data OFDM symbols using channel estimates that are no longer accurate.

Generally, in a receiving device successive received OFDM symbols are separated (in time) by a guard interval. The guard interval is configured to accommodate echoes or micro-reflections from, e.g., discontinuities in the channel. The guard interval may include a cyclic prefix used to facilitate performing a discrete Fourier transform (e.g., a fast Fourier transform (FFT)) utilized in recovery of data from an OFDM symbol. Further, communication channels may be susceptible to in-band interference. Typically, in-band interference is not orthogonal to OFDM sub-carriers so that when the FFT is performed, a narrow band interferer may experience spectral widening due to the windowing operation associated with the FFT. In other words, the window length is not typically a whole number multiple of interferer frequency periods. Thus, an external interferer with a bandwidth of a few MHz (Megahertz) may spread to tens of MHz because of the windowing, thereby affecting a number of sub-carriers and their associated data.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to communication systems (and methods) configured to provide adaptive channel prediction and/or mitigate interference in OFDM systems. In an embodiment, adaptive channel prediction (i.e., channel tracking) is configured to predict and/or interpolate a channel frequency response between channel frequency response estimates that have been determined based on probing symbols. The predicted channel frequency response may then be utilized to pre-equalize and/or equalize OFDM symbols that include data. The prediction and interpolation are configured to accommodate variation in the channel characteristics between channel frequency response estimates determined based on the probing symbols.

In another embodiment, a communication system and method consistent with the present disclosure are configured to optimize sharing each guard interval associated with a respective received OFDM symbol. A first portion of the guard interval may be utilized for accommodating microreflections and a second portion of the guard interval (i.e., guard interval remainder) may be utilized for windowing using, e.g., a raised cosine window. A duration of the first portion may be determined based, at least in part, on a modulation scheme, e.g., 1024 QAM (1024 point quadrature amplitude modulation), a channel impulse response and signal to noise ratio (SNR) specifications of the modulation scheme. A duration of the guard interval remainder may then be determined based on the size of the guard interval and the duration of the first portion. Windowing associated the with an FFT (fast Fourier transform) may then be performed at a receiving device with tapering configured to reduce spectral spread associated with external interferers, as described herein.

Figure 1:
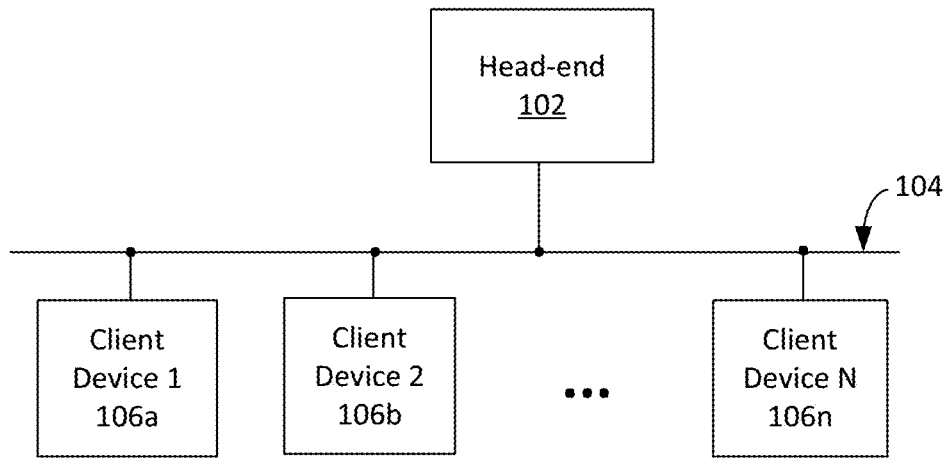
FIG. 1 illustrates a network system consistent with various embodiments of the present disclosure.

FIG. 1 illustrates a network system 100 consistent with various embodiments of the present disclosure. Network system 100 generally includes a head-end 102, and at least one client device 106a, . . . , 106n. In some embodiments, head-end may correspond to a cable modem termination system (CMTS) and each client device may correspond to a cable modem. In some embodiments, the head-end may correspond to a digital subscriber line access multiplexer (DSLAM) and the client device may correspond to a DSL modem. The head-end 102 may typically be included in a services provider facility. One or more client device(s) 106a, . . . , 106n may be located at respective customer locations. The head-end 102 is configured to communicate with each client device 106a, . . . , 106n and each client device 106a, . . . , 106m configured to communicate with head-end 102 via communication network 104. The communication network 104 may comprise, for example, optical fiber, coaxial cable, copper twisted pair, copper twin-axial cable, etc. and/or a combination thereof, e.g., hybrid fiber coax (HFC). In some embodiments, the communication network 104 may include a plurality of logical and/or physical channels (e.g., differential pair channels) that provide separate connections between, for example, a transmitter and receiver of the head-end 102 and a receiver and transmitter, respectively, of a client device, e.g., client device 106a.

The head-end 102 and each client device 106a, . . . , 106n may communicate with each other, via communication network 104, using a data plus other service communications protocol, for example, a DOCSIS® (data over cable service interface specification) communications protocol, a DSL (digital subscriber line) communications protocol, etc. The DOCSIS® communications protocol may comply or be compatible with the DOCSIS® 3.1 specification published by CableLabs titled "DOCSIS® 3.1 Physical Layer Interface Specification, CM-SP-PHYv3.1-I01-131029", released October 2013 and/or later versions of this specification. The DSL protocol may comply or be compatible with the ADSL (asymmetric digital subscriber line) Recommendation G.992.1 published by the Telecommunication Standardization Sector of the International Telecommunication Union (ITU-T), titled "Asymmetric digital subscriber line (ADSL) transceivers", published June 1999 and/or later versions of this Recommendation, for example, ITU-T Recommendation G.992.3, titled "Asymmetric digital subscriber line transceivers 2 (ADSL2)", published by the ITU-T July 2002. Of course, in other embodiments, the data plus other service communications protocol may include a custom and/or proprietary data plus other services communications protocol.

Head-end 102 and client device(s) 106a, . . . , 106n are configured to communicate using OFDMA (orthogonal frequency division multiple access). Head-end 102 may be configured to transmit one or more OFDM (orthogonal frequency division multiplexing) symbols in an OFDMA symbol to client device(s) 106a, . . . , 106n. Head-end 102 may be configured to receive one or more OFDM symbols from client device(s) 106a, . . . , 106n. Thus, head-end 102 may correspond to a transmitting device or a receiving device. Each client device 106a, . . . , 106n is configured to transmit or receive respective OFDM symbols to or from head-end 102. Thus, each client device 106a, . . . , 106n may be a transmitting device or a receiving device.

Each OFDM symbol includes a plurality of orthogonal subcarriers that may include data subcarrier(s) modulated with data and pilot subcarriers configured to be used, e.g., for estimating channel characteristics. Head-end 102 may be configured to assign a respective subset of available subcarriers of an OFDMA symbol to each client device 106a, . . . , 106n. Each client device 106a, . . . , 106n may then be configured to transmit and/or receive OFDM symbols that include respective assigned subcarriers. Head-end 102 may then be configured to transmit and/or receive a plurality of OFDM symbols that collectively include all of the assigned subcarriers of the OFDMA symbol.

Figure 2:
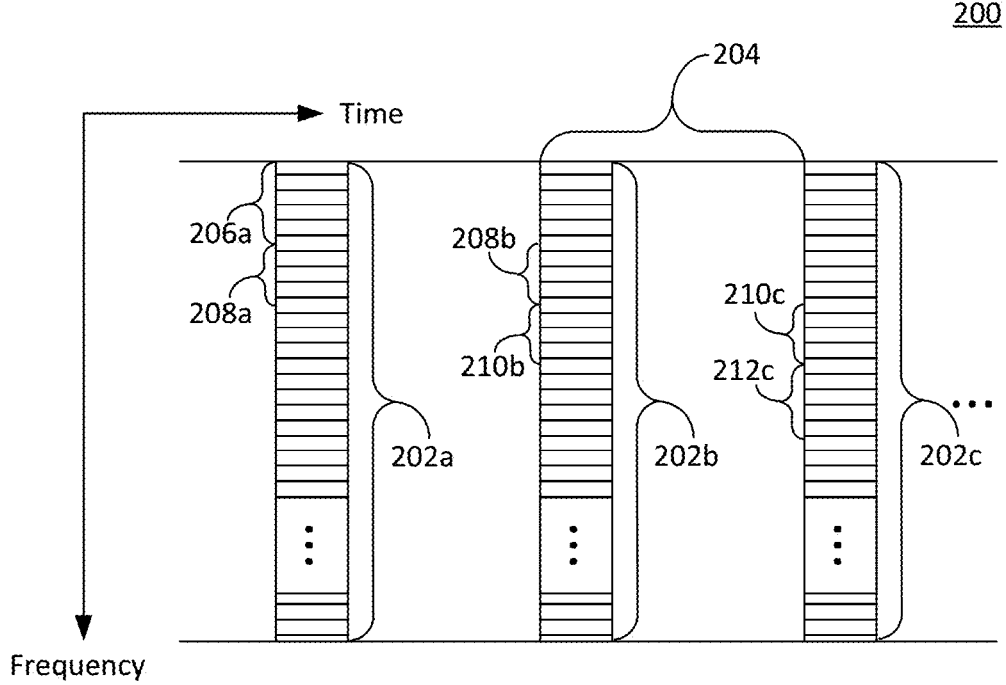
FIG. 2 illustrates an example of a sequence of probing symbols consistent with various embodiment of the present disclosure.

FIG. 2 illustrates an example sequence of OFDMA probing symbols 202a, 202b, 202c. In the example 200, the vertical axis corresponds to frequency and the horizontal axis corresponds to time. Successive probing symbols are separated in time by time interval 204. For example, the time interval 204 duration may be on the order of ones or tens of seconds. Each OFDMA probing symbol, e.g., probing symbol 202a, may include one or more probing OFDM symbols, e.g., OFDM probing symbols 206a, 208a. The data subcarriers of OFDMA probing symbols 202a, 202b, 202c are configured to be modulated with probing information, e.g., known data. The OFDMA probing symbols 202a, 202b, 202c are configured to be utilized for determining (estimating) channel characteristics, as described herein.

The OFDMA probing symbols 202a, 202b, 202c may be shared by a plurality of client devices, e.g., client device(s) 106a, . . . , 106n of FIG. 1. In an embodiment, each OFDMA probing symbol 202a, 202b, 202c may be utilized by a respective client device. For example, the first OFDMA probing symbol 202a may be assigned to a first client device, e.g., client device 106a, the second OFDMA probing symbol 202b may be assigned to a second client device, e.g. client device 106b, and subsequent OFDMA probing symbols may each be assigned to respective client devices. The head-end 102 may then be configured to determine a respective frequency response corresponding to a full channel bandwidth for each client device 106a, . . . , 106n based, at least in part, on the respective OFDMA probing symbol.

In another embodiment, each OFDMA probing symbol 202a, 202b, 202c may be shared by a plurality of client devices, e.g., client devices 106a, . . . , 106n. OFDMA probing symbols 202a, 202b, 202c may be shared, for example, when a respective client device is unable to transmit over the full channel bandwidth, e.g., because of power limitations. A variety of sharing schemes, including, e.g., interlaced sharing, may be utilized. For example, each client device 106a, . . . , 106n may be assigned a portion of each OFDMA probing symbol 202a, 202b, 202c. The portion assigned may change for each subsequent OFDMA probing symbol so that over a sequence of OFDMA probing symbols a total of the portions assigned to each client device 106a, . . . , 106n corresponds to a complete OFDMA probing symbol. The head-end 102 is configured to determine a respective portion of a channel frequency response for each client device 106a, . . . , 106n for each OFDMA probing symbol. The head-end 102 may thus determine a respective frequency response over a full channel bandwidth for each client device 106a, . . . , 106n by determining a respective frequency response for each portion of the OFDMA probing symbol for each client device 106a, . . . , 106n.

For example, OFDM probing symbol 206a of first OFDMA probing symbol 202a may be assigned to first client device 106a and OFDM probing symbol 208a of first OFDMA probing symbol 202a may be assigned to second client device 106b. OFDM probing symbol 208b of second OFDMA probing symbol 202b may be assigned to first client device 106a and OFDM probing symbol 210b of second OFDMA probing symbol 202b may be assigned to second client device 106b. OFDM probing symbol 210c of third OFDMA probing symbol 202c may be assigned to first client device 106a and OFDM probing symbol 212c of third OFDMA probing symbol 202c may be assigned to second client device 106b. The process may continue with subsequent OFDMA probing symbols until the client devices 106a, 106b have been assigned OFDM probing symbols covering the entire OFDMA probing symbol, i.e., the full channel bandwidth. The plurality of OFDM probing symbols for each client device 106a, 106b may then be utilized to estimate channel characteristics (e.g., channel frequency response) for a first channel configured to couple, e.g., head-end 102 to first client device 106a and a second channel configured to couple the head-end 102 to second client device 106b. Thus, a channel characteristic (e.g., channel frequency response) at a point in time (i.e., a snapshot) may be estimated based, at least in part, on one or more OFDM probing symbols.

Figure 3:
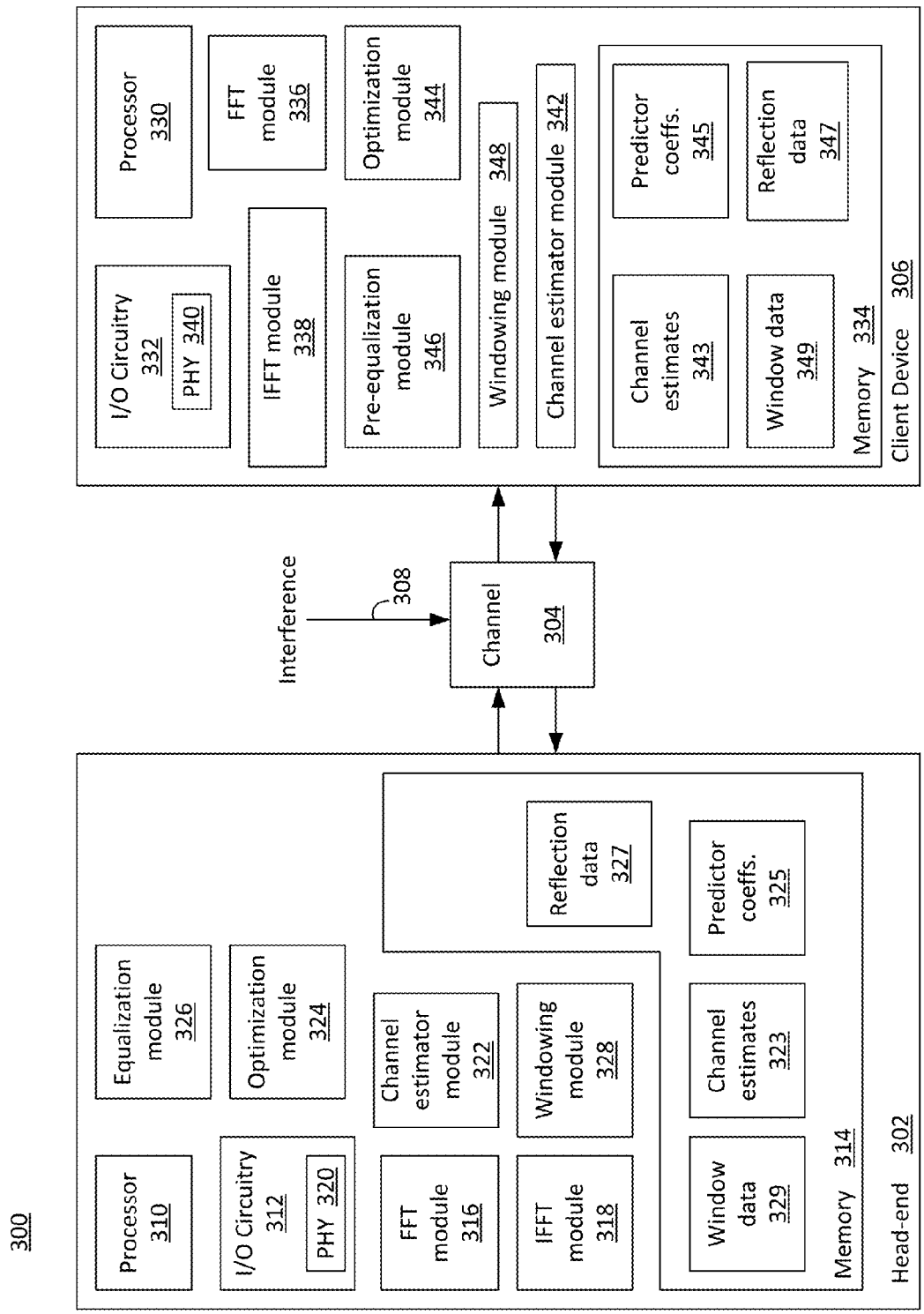
FIG. 3 illustrates a communication system consistent with various embodiments of the present disclosure.

FIG. 3 illustrates a communication system 300 consistent with various embodiments of the present disclosure. The communication system 300 includes a head-end 302, a communication channel 304 and a client device 306. Head-end 302 is one example of head-end 102 of FIG. 1 and client device 306 is one example of client device(s) 106a, . . . , 106n of FIG. 1. Communication channel 304 represents a portion of communication network 104, configured to couple head-end 302 to client device 306. Head-end 302 is configured to communicate (i.e., transmit and/or receive information) with client device 306 via channel 304. Information includes commands, data, audio, video, voice, etc.

Head-end 302 and client device 306 each include a respective processor 310, 330 configured to perform at least some of the operations of the head-end 302 and client device 306, respective I/O circuitry 312, 332 configured to couple head-end 302 and client device 306 to each other via, e.g., channel 304 and respective memory 314, 334 configured to store data, estimates, coefficients, etc., related to the respective operations of head-end 302 and client device 306.

Each I/O circuitry 312, 332 includes respective PHY circuitry 320, 340 that may each include transmit circuitry configured to transmit OFDM symbols that may include data packets and/or frames via channel 304 and receive circuitry configured to receive OFDM symbols that may include data packets and/or frames via channel 304. Of course, PHY circuitry 320, 340 may also include encoding/decoding circuitry configured to perform analog-to-digital and digital-to-analog conversion, encoding and decoding of data, and recovery of received data.

Head-end 302 and client device 306 each include a respective FFT module 316, 336 configured to determine an N-point discrete Fourier transform (e.g., a fast Fourier transform) and a respective IFFT module 318, 338 configured to determine an N-point inverse discrete Fourier transform (e.g., an inverse fast Fourier transform). As is known, an FFT may be utilized to determine frequency spectrum (i.e., magnitude and phase) of a finite duration of a discrete time signal and an inverse FFT may be utilized to produce a discrete time signal corresponding to a discrete frequency spectrum. For example, an impulse response of channel 304 may be determined based, at least in part, on a frequency response of channel 304.

Channel 304 may be characterized by one or more channel characteristics. Such channel characteristics include channel impulse response and channel frequency response. These channel characteristics are related to channel physical properties such as length, discontinuities, branches and/or terminations (that may result in reflection (i.e., echoes) related to a transmitted symbol) and channel media properties such as finite bandwidth and/or nonlinear characteristics. Such channel properties may distort (i.e., degrade) at least a portion of an OFDM symbol and may therefore make recovering transmitted information difficult. Equalization may be used to compensate for such channel properties and equalization parameters may be determined based, at least in part, on an estimate of channel characteristics (e.g., channel impulse response and/or channel frequency response). For example, the channel frequency response may be determined based on one or more probing symbols, e.g., probing symbols 206a, 206b and 208a, 208b of FIG. 2.

Equalization may be performed in a receiving device, e.g., head-end 302, on a received OFDM symbol and/or pre-equalization may be performed in a transmitting device, e.g., client device 306, prior to transmitting the OFDM symbol. Both equalization and pre-equalization parameters may be determined based, at least in part, on the estimates of channel characteristics ("channel estimates"). Channel characteristics may be time varying, thus, equalization and/or pre-equalization based on channel estimates may be accurate for finite time periods. Channel estimates may be periodically updated (e.g., with a period corresponding to the time interval 304) and corresponding equalization and/or pre-equalization parameters may likewise be periodically updated. Equalization and/or pre-equalization performed during the time interval 304 may initially correspond to actual channel characteristics but may degrade between two successive probing symbols due to changing channel characteristics. Such degradation in equalization and/or pre-equalization may have limited effect on relatively small QAM constellations (e.g., QAM64) but may have a relatively significant effect on higher order QAM constellations (e.g., QAM1024, QAM4096).

In an embodiment, head-end 302 and client device 306 may be configured to adaptively predict channel characteristics between probing symbols and to thus improve performance of communication system 300 in the presence of channel variation between probing symbols. Head-end 302 may include a head-end channel estimator module 322 and client device 306 may include a client device channel estimator module 342. Head-end channel estimator module 322 is configured to request that client device channel estimator module 342 transmit a probing symbol at a time interval. The time interval may correspond to time interval 204 of FIG. 2 and thus, may be on the order of ones to tens of seconds. The probing symbol includes a known bit sequence that may then be utilized by head-end channel estimator module 322 to estimate a channel frequency response, $H_n(k)$ where n corresponds to a probing symbol index, k corresponds to a subcarrier index and H corresponds to frequency response estimate determined based on a probing symbol. k may have a range of 0 to N−1 where N corresponds to a number of subcarriers assigned to the probing symbol. Thus, N may correspond to at least a portion of the subcarriers included in the OFDMA probing symbol, e.g., probing symbol 202a of FIG. 2. The channel estimates $H_n(k)$, k=0, . . . , N−1, thus correspond to channel frequency response estimates determined based, at least in part, on a probing symbol. The head-end channel estimator module 322 may be configured to store the channel estimates 323 in memory 314. The head-end channel estimator module 322 may then be configured to provide the estimated channel frequency $H_n(k)$ response to the client device channel estimator module 342, e.g., via I/O circuitry 312, channel 304 and I/O circuitry 332.

For example, the subcarriers of each OFDM probing symbol may be modulated with a modulation pattern, e.g., binary phase-shift keying (BPSK), known to the head-end 302. The head-end 302 is configured to remove the known modulation pattern from a received OFDM probing symbol. The received subcarriers without the known modulation pattern may then correspond to the channel frequency response. For example, to BPSK modulate a set of OFDM subcarriers, the client device 306 may multiply the subcarriers with a sequence of +1 s and −1 s (i.e., plus ones and minus ones). The BPSK modulating sequence is known by the head-end 302. The head-end 302, e.g., channel estimator module 322, may then be configured to multiply the subcarriers of the received OFDM symbol with the same sequence of +1 s and −1 s to remove the BPSK modulation to yield an estimate (i.e., a snapshot) of the channel frequency response.

Similarly, head-end 102 of FIG. 1 may be configured to request a probing symbol from one or more of the plurality of client devices 106a, . . . , 106n, to estimate a respective channel frequency response for each client device 106a, . . . , 106n and to provide the respective channel estimate to the respective client device 106a, . . . , 106n. The channel estimates may differ due to differing channel properties between each client device 106a, . . . , 106n and the head-end 102. Thus, head-end 102 and corresponding head-end 302 may not typically be configured to equalize OFDM symbols received from each client device 106a, . . . , 106n. Each client device 106a, . . . , 106n may be configured to pre-equalize prior to transmitting respective OFDM symbol data to the head-end 102, as described herein.

Client device channel estimator module 342 may be configured to receive channel estimate(s) $H_n(k)$ for each probing symbol. Client device channel estimator module 342 is configured to store a history of channel estimates 343 in memory 334. For example, the history of channel estimates may include four channel estimates: $H_{n-3}(k)$, $H_{n-2}(k)$, $H_{n-1}(k)$ and $H_n(k)$, (k=0, . . . , N−1) where $H_n(k)$ corresponds to the current channel estimate and $H_{n-3}(k)$ corresponds to the oldest channel estimate. In other embodiments, more or fewer channel estimates may be included in the history. Client device channel estimator module 342 may then predict a next channel frequency response for each subcarrier index k based, at least in part, on the history of channel frequency responses. The predicted next channel frequency response may be determined as:

$$\hat{H}_{n+1}(k) = \sum_{i=0}^{3} \alpha_i H_{n-i}(k)$$

where $\hat{H}_{n+1}(k)$ is the predicted next channel frequency response for subcarrier k, $\alpha_i$ is a linear predictor coefficient and $H_{n-i}(k)$ corresponds to the $i^{th}$ channel frequency response in the history of channel frequency responses. Client device channel estimator module 342 may be configured to store the predicted next channel frequency response 343 in memory 334. Client device channel estimator module 342 may be configured to maintain a history of predicted channel frequency responses, e.g. $\hat{H}_{n+1}(k)$ and $\hat{H}_n(k)$ for each subcarrier index k.

Client device 306 may include a pre-equalization module 346. Pre-equalization module 346 may be configured to interpolate between $\hat{H}_{n+1}(k)$ and $\hat{H}_n(k)$, i.e., between probing symbol n and probing symbol n+1, to determine an estimated channel frequency response $\tilde{H}_m(k)$ for each OFDM symbol between probing symbol n and probing symbol n+1. For example, a number, e.g., M, OFDM (data) symbols may be transmitted between probing symbols, thus, m=0, 1, . . . , M−1. The estimated channel frequency response for each data OFDM symbol may be determined as:

$$\tilde{H}_m(k) = \frac{M-m}{M}\hat{H}_n(k) + \frac{m}{M}\hat{H}_{n+1}(k).$$

The equation for $\tilde{H}_m(k)$ is configured to weight $\hat{H}_n(k)$ relatively more heavily for OFDM symbols relatively nearer the current probing symbol n that corresponds to $H_n(k)$ and to weight $\hat{H}_{n+1}(k)$ relatively more heavily for OFDM symbols relatively nearer the next probing symbol n+1. In some embodiments, the predicted channel frequency response $\hat{H}_n(k)$ may be utilized to determine $\tilde{H}_m(k)$. In some embodiments, the channel frequency response estimate $H_n(k)$ provided by the head-end 302 may be utilized to determine $\tilde{H}_m(k)$. Utilizing $\hat{H}_n(k)$ may be relatively more desirable since $H_n(k)$ may be noisy while $\hat{H}_n(k)$ may include relatively less noise due to filtering.

The client device channel estimator module 342 is configured to determine a prediction error, $\epsilon(k)$, in response to receiving the next channel estimate $H_{n+1}(k)$ from head-end channel estimator module 322. The head-end channel estimator module 322 may be configured to determine the next channel estimate $H_{n+1}(k)$ in response to receiving probing symbol n+1 from client device 306. The prediction error $\epsilon(k)$ may be determined as:

$$\epsilon(k) = H_{n+1}(k) - \hat{H}_{n+1}(k).$$

The client device channel estimator module 342 is configured to update the linear predictor coefficients $\alpha_i$ (i=0, 1, 2, 3) using a normalized least mean square (NLMS) technique. For example, the linear predictor coefficients $\alpha_i$ may be determined as:

$$\alpha_i \Leftarrow \alpha_i + \mu \frac{1}{N} \sum_{k=0}^{N-1} \frac{H^*_{n-i}(k)\varepsilon(k)}{\sum_{l=0}^{3} |H_{n-l}(k)|^2} \text{ for } i = 0, 1, 2, 3.$$

The linear predictor coefficients 345 may be stored in memory 334. Thus, the linear predictor coefficients may be updated based, at least in part, on the history of channel estimates $H_{n-i}(k)$, the error between the next channel estimate $H_{n+1}(k)$ and the predicted next channel frequency response $\hat{H}_{n+1}(k)$ for N sub-carriers (i.e., k=0, 1, ..., N−1). The parameter µ is a weighting factor that affects convergence. For example, µ may be in the range zero to two. Selection of a value for the parameter µ may be based, at least in part, on the dynamic characteristics of the channel relative to a measurement period. For example, if the channel is relatively slowly varying then the value of µ may be made relatively small. A relatively high initial value (e.g., µ=0.25) may facilitate faster convergence of the channel frequency response estimate. Once converged, for relatively slowly time varying channels, the value of µ may be made relatively small (e.g., µ=0.05). For relatively fast time varying channels the value of µ may remain relatively high (e.g., µ=0.25).

In this embodiment, client device 306 is configured to perform predictive channel pre-equalization based, at least in part, on channel frequency response data provided by head-end 302. Head-end 302 is not configured to perform equalization in this embodiment. Thus, channel changes may be tracked with little or no latency.

In another embodiment, client device channel estimator module 342 may be configured to predict a time varying component of the channel frequency response rather than the entire channel frequency response. In this embodiment, a mean (i.e., average) channel frequency response, $\overline{H}_n(k)$ may be determined based, at least in part, on the channel frequency response estimates 343 stored in memory 334. For example, the history of channel frequency response estimates may be summed and divided by the number of channel frequency response estimates in the history as:

$$\overline{H}_n(k) = \frac{\sum_{i=0}^{P-1} H_{n-i}(k)}{P}.$$

For example, P may be equal to four. More or fewer channel frequency response estimates may be used to determine the average channel frequency response $\overline{H}_n(k)$. In another example, the mean value of the channel frequency response may be determined using recursive filtering. A mean channel frequency response may be recursively updated for each received estimate as:

$$\overline{H}_n(k) \leftarrow (1-\beta)\overline{H}_n(k) + \beta H_n(k)$$

The value of β is in the range of zero to one and may be set to a relatively small number, e.g., 1/16 (i.e., 0.0625).

The mean channel frequency response $\overline{H}_n(k)$ may then be subtracted from each channel estimate $H_n(k)$ to yield the time varying component, e.g., $H_n'(k)$, of the channel frequency response. The error and linear predictor coefficients may then be determined based, at least in part, on the time varying component $H_n'(k)$ of the channel frequency response rather than the channel frequency response $H_n(k)$. Predicting based on the time varying component of the channel frequency response may reduce a dynamic range associated with components involved in the prediction and may result in a relatively better channel estimate. Reducing the dynamic range may facilitate fixed point arithmetic (i.e., may reduce the number of bits needed to represent, e.g., a channel frequency response) associated with predicting channel frequency response (e.g., error and linear predictor coefficients) and thus may result in a more efficient implementation.

In another embodiment, client device pre-equalization module 346 may be configured to pre-equalize OFDM symbols using the current channel estimate $H_n(k)$ from head-end channel estimator module 322 rather than $\hat{H}_n(k)$. In this embodiment, the head-end 302, e.g., head-end channel estimator module 322, may be configured to predict a residual component (i.e., time varying component) of the channel frequency response. For example, a history of channel frequency response estimates 323 may be stored in memory 314. The linear predictor coefficients may be determined based, at least in part, on the residual components. Head-end equalizer module 326 may then be configured to perform equalization of received pre-equalized OFDM symbols based, at least in part, on predicted residual channel estimates.

In another embodiment, client device pre-equalization module 346 may be configured to pre-equalize the probing symbol, prior to transmitting the probing symbol to the head-end 302. The client device pre-equalization module 346 may be configured to pre-equalize the probing symbol based on the latest channel estimate (e.g., $H_n(k)$) received from the head-end 302. The head-end channel estimator module 322 may then be configured to determine a channel frequency response (i.e., channel estimate $H_{n+1}(k)$) based, at least in part on the received pre-equalized probing symbol. If the channel frequency response hasn't changed between $H_n(k)$ and $H_{n+1}(k)$, then the received pre-equalized probing symbol corresponds to the probing symbol. If the channel frequency response has changed, then the channel estimate determined by the head-end channel estimator module 322 may correspond to the time varying component.

Continuing with this embodiment, client device pre-equalization module 346 is configured to pre-equalize the n+1 probing symbol based on the current channel estimate $H_n(k)$ and to transmit this pre-equalized probing symbol to head-end 302. Client device pre-equalization module 346 is also configured to pre-equalize data OFDM symbols. The head-end channel estimator module 322 is configured to determine a channel estimate $E_{n+1}(k)$ (k=0, ..., N−1) from the received pre-equalized probing symbol. Thus, $E_{n+1}(k)$ represents a channel frequency response estimate based, at least in part, on a pre-equalized probing symbol. If there have been no channel frequency response variations since determining the prior channel estimate $H_n(k)$, then the head-end channel estimate $E_{n+1}(k)$ should be unity (i.e., one) for all subcarriers in the probing symbol, i.e., all values of k. If the channel frequency response has changed then the $E_{n+1}(k)$ represents the change in the channel frequency response. The head-end channel estimator module 326 may then configured to provide the channel estimate $E_{n+1}(k)$ to client device 306 for pre-equalization purposes. Client device channel estimator module 342 is then configured to multiply the prior pre-equalization frequency response by the channel estimate to get a new channel frequency response for pre-equalization. The new channel frequency response may be determined as:

$$H_n(k) = H_{n-1}(k) * E_n(k)$$

where $E_n(k)$ is the current channel estimate from the head-end, $H_{n-1}(k)$ is the prior pre-equalization frequency response and $H_n(k)$ is the new channel frequency response for pre-equalization. Thus, $H_n(k)$ corresponds to the prior pre-equalization frequency response updated with the head-end new estimate that includes channel variation (if any) since the prior estimate. The client device 306 may then use this channel estimate in the prediction-based algorithm, as described herein, for pre-equalization.

The head-end 302 may be configured to retain a history of a number (e.g., four) successive estimates, e.g., $E_{n-3}(k)$, $E_{n-2}(k)$, $E_{n-1}(k)$ and $E_n(k)$. These estimates may be stored, for example, in memory 314 (channel estimates 323). Head-end channel estimator module 322 may then be configured to predict a next estimate $\hat{E}_{n+1}(k)$ as:

$$\hat{E}_{n+1}(k) = \sum_{i=0}^{3} \alpha_i E_{n-i}(k).$$

Head-end equalizer module 326 is configured to linearly interpolate between $\hat{E}_n(k)$ and $\hat{E}_{n+1}(k)$, similar to pre-equalization module 346, as described herein. The head-end estimate for each OFDM symbol between probing symbols may then be determined as:

$$\tilde{E}_m(k) = \frac{L-m}{L}\hat{E}_n(k) + \frac{m}{L}\hat{E}_{n+1}(k) \text{ for } m = 0, 1, \ldots, L-1.$$

Head-end equalizer module 326 may then utilize $\tilde{E}_m(k)$ to equalize the $m^{th}$ OFDM symbol between two successive probing symbols n and n+1. Thus, the $m^{th}$ OFDM symbol may be pre-equalized by the channel frequency response $H_n(k)$ at client device 306 (by, e.g., client device pre-equalization module 346) and equalized by the predicted channel frequency response $\tilde{E}_m(k)$ at the head-end 302 (by, e.g., head-end equalizer module 326). When the next probing symbol is received, the head-end channel estimator module 322 is configured to determine a prediction error as:

$$\epsilon(k) = E_{n+1}(k) - \hat{E}_{n+1}(k).$$

The head-end channel estimator module 322 is configured to update the linear predictor coefficients $\alpha_i$ (i=0, 1, 2, 3) using a normalized least mean square (NLMS) technique, as described herein. The linear predictor coefficients 325 may be stored in memory 314. Thus, in this embodiment, the client device 306 is configured to perform non-predictive pre-equalization and the head-end 302 is configured to perform predictive residual equalization.

Figure 4:
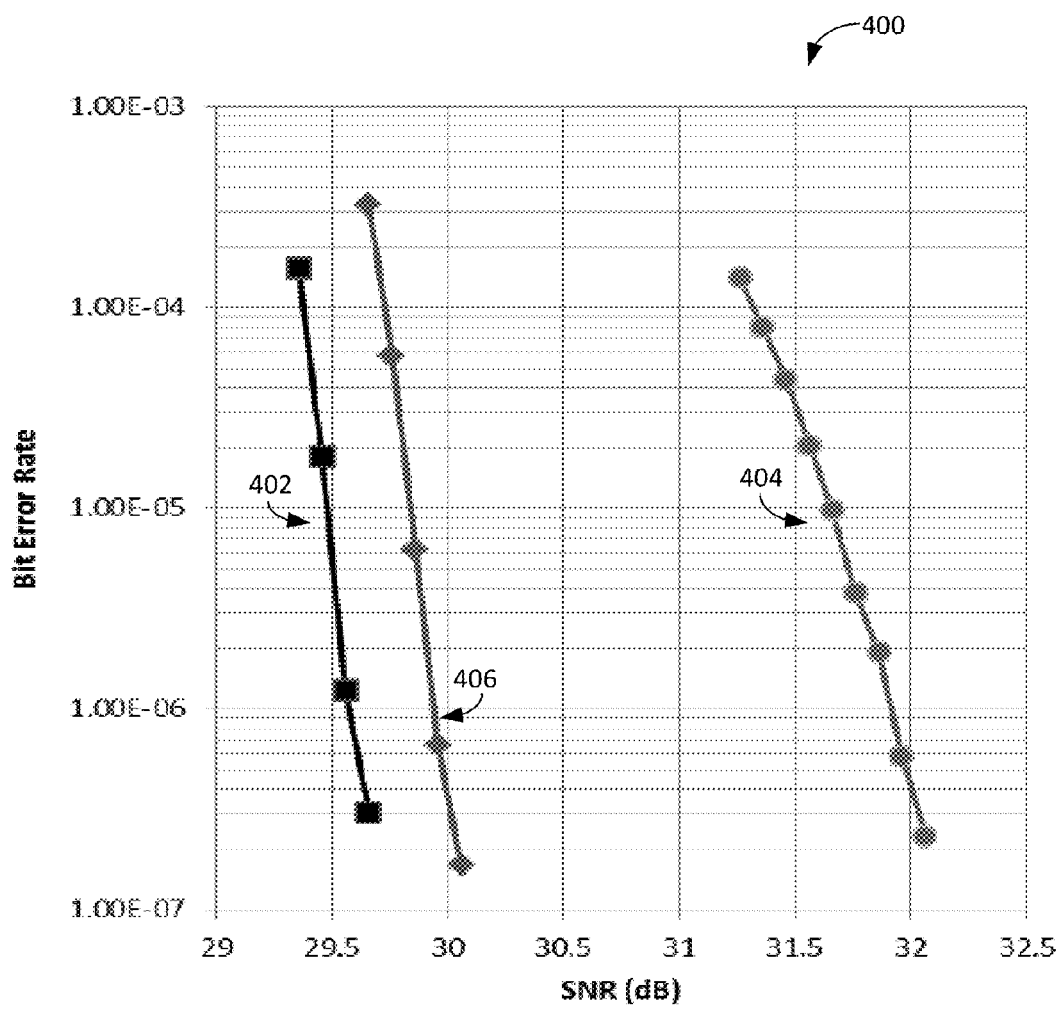
FIG. 4 illustrates a graph of bit error rate (BER) versus signal to noise ratio (SNR) for a simulated example communication system consistent with one embodiment of the present disclosure.

FIG. 4 illustrates a graph 400 of bit error rate (BER) versus signal to noise ratio (SNR) for a simulated example communication system consistent with one embodiment of the present disclosure. In this example, a client device is configured to perform non-predictive pre-equalization and the head-end is configured to perform predictive residual equalization. In this example, a client device with pre-equalization was configured to transmit a 16 k (i.e., 16,384 point) FFT OFDM (80 μs (microsecond) symbol size) modulated with a QAM constellation 1024. The channel was simulated to include both multi-path (i.e. delayed symbols) and a Doppler effect. Multi-path included an echo with four paths: −10 dB (decibel) at 0.5 μs, −15 dB at 1.0 μs, −20 dB at 1.5 μs and −30 dB at 4.5 μs. To model relatively slow channel changes, additional paths have been superimposed (at these same delays) with a relative strength of −20 dB (with respect to the path at that delay) and 5.0 Hz of pure Doppler. The head-end was modeled as an OFDM receiver with a channel equalizer and an LPDC (low density parity check) decoder with block size 16,200 bits and rate 8/9.

Graph 400 illustrates the performance of the entire communication system, e.g., communication system 300 without external interference. The vertical axis is the bit error rate (BER) at the output of the LDPC decoder and the horizontal axis is the signal to noise ratio (SNR) in dB. Line 402 illustrates additive white Gaussian noise (AWGN) performance in the absence of both multipath (e.g., echo) and Doppler effects. Line 404 illustrates performance when predictive equalization is not used, pre-equalization was used in the transmitting device (e.g., $H_n(k)$) but without predictive channel equalization in the receiving device (head-end). The illustrated performance loss may be due to not accounting for the relatively slow channel frequency response variations between probing symbols used to estimate the channel frequency response. In this example, the probing symbols were spaced every 45 OFDM symbols. Line 406 illustrates the combination of pre-equalization in the transmitting device (i.e., client device) and predictive channel estimation and equalization in the receiving device (i.e., head-end). Line 406 illustrates superior performance as compared to line 404 and is relatively closer to line 402. It is expected that performance gains will be higher for higher order constellations and/or a greater number of time varying channels.

Thus, a communication system consistent with the present disclosure may be configured to adaptively predict channel characteristics, i.e., channel frequency response, based, at least in part, on a plurality of prior channel frequency response estimates and a plurality of prediction coefficients. The channel frequency response estimates may be determined based on probing symbols and the prediction coefficients may be determined based, at least in part, on a difference between an estimated channel frequency response and a predicted channel frequency response using a normalized least mean square technique. Pre-equalization and/or equalization may then be performed on OFDM symbols transmitted and received in a time interval between the probing symbols. In some embodiments, the pre-equalization and/or equalization may be performed based on the time varying component of the channel frequency response configured to provide improved sensitivity and improved accuracy. Thus, variation in channel frequency response between probing symbols may be accommodated.

Turning again to FIG. 3, in another embodiment, communication system 300 may be configured to reduce spectral spread of an external interference in an OFDM symbol while mitigating (i.e., limiting) microreflection interference (e.g., intersymbol interference (ISI) and intercarrier interference (ICI)), as described herein. External interference, e.g., external interferer 308, may be introduced into channel 304 and may combine with an ODFM symbol as it travels from a transmitting device to a receiving device. The head-end 302 may be the transmitting device and the client device 306 may be the receiving device or the client device 306 may be the transmitting device and the head-end 302 may be the receiving device. The external interferer 308 may be narrow band with a carrier frequency that is in-band relative to the OFDM symbol. For example, the external interferer 308 may correspond to a terrestrial electromagnetic signal associated with cellular telephones and the OFDM symbol may correspond to wired electromagnetic signal.

Microreflection interference includes intersymbol interference and intercarrier interference. Intersymbol interference occurs when reflections (i.e., echoes) of a previous OFDM symbol arrive at the receiving device during reception of a current OFDM symbol. Intercarrier interference accompanies intersymbol interference and occurs as a result of a reflected version of a OFDM symbol being truncated by the OFDM FFT window. Intersymbol and intercarrier interference may be mitigated by adding a guard interval between successive OFDM symbols.

Figure 5:
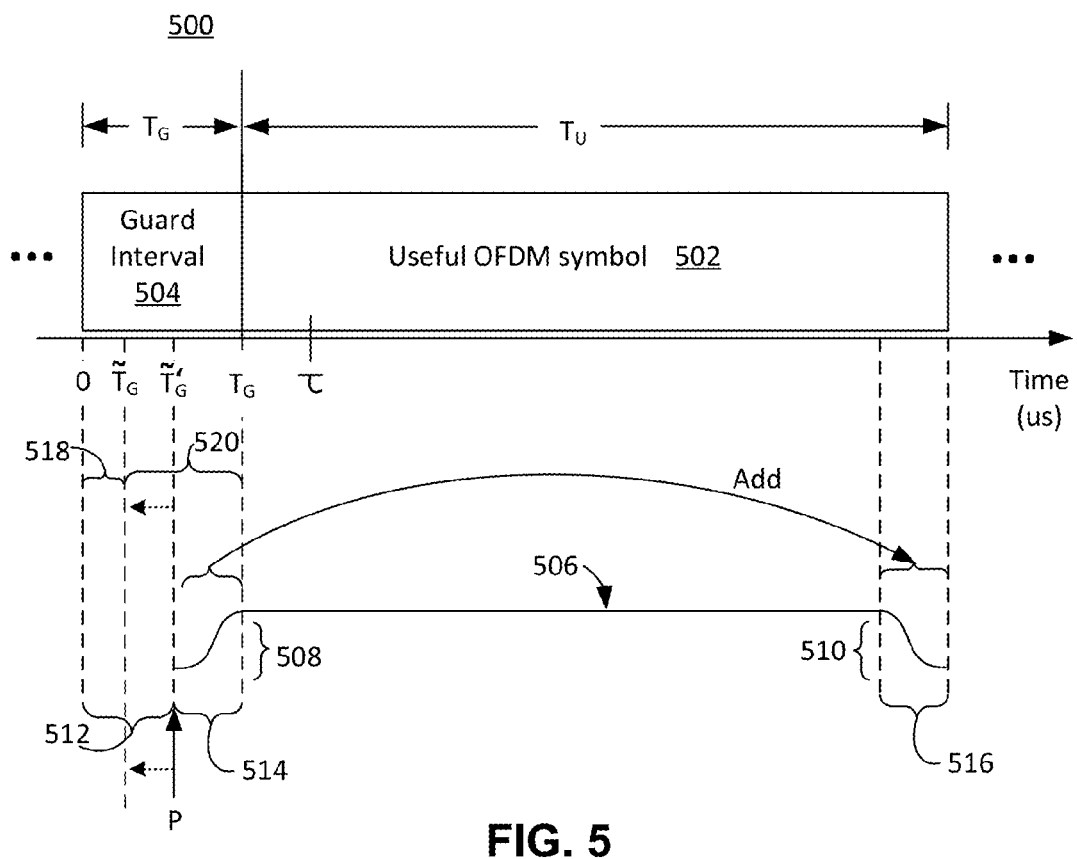
FIG. 5 illustrates an example of a portion of a sequence of received OFDM symbols and associated guard intervals consistent with one embodiment of the present disclosure.

FIG. 5 illustrates an example 500 of a portion of a sequence of received OFDM symbols and associated guard intervals. In this example 500, the horizontal axis corresponds to time. The example 500 includes a useful OFDM symbol 502 preceded by an associated guard interval 504. Guard interval 504 may be preceded on the left by another useful OFDM symbol preceded by another guard interval, etc., and OFDM symbol 502 may be followed on the right by another guard interval followed by another useful OFDM symbol, etc. A duration of the guard interval 504 is $T_G$ and a duration of the useful OFDM symbol 502 (i.e., symbol period) is $T_U$. OFDM symbol period $T_S$ corresponds to the duration of the guard interval $T_G$ plus the useful symbol period $T_U$.

As part of data recovery at the receiving device, a window, e.g., window 506, may be applied to the OFDM symbol 502 that is configured to provide a time-limited input to an FFT. A "boxcar"—shaped window is desirable because it is flat over the window width and, thus, does not change relative amplitudes of the frequency components in the OFDM signal. A boxcar-shaped window that has relatively sharp edges may result in spectral dispersion of the subcarriers because the OFDM symbol may have a non-zero amplitude subcarriers at the window edges (i.e., Fourier transform of pulse is a sinc function). The orthogonality characteristic of OFDM subcarriers is configured so that such spectral dispersion of the subcarriers does not cause interference when recovering data. The boxcar window in the receiving device applied to the external interference results in spectral dispersion so that a relatively narrow band interferer (e.g., 2 or 3 MHz) may affect tens of MHz of OFDM subcarriers. Since the external interference is typically not orthogonal to the OFDM subcarriers, such spectral dispersion can negatively affect data recovery at the receiving device. Such dispersion effects may be mitigated by utilizing a window with tapered (e.g., raised cosine window) edges, e.g., window 506 and tapered edges 508, 510. The tapered edges 508, 510 of the window are configured to ensure that an amplitude of the OFDM symbol (and the external interferer) is at or near zero at the start and the end of the window. Elimination of the sharp edges reduces the spectral dispersion.

A cyclic prefix may be added to the start of a useful OFDM symbol by a transmitter. The cyclic prefix is simply a tail portion of the useful OFDM symbol that corresponds to a fraction (e.g., 1/8) of the useful OFDM symbol period, T. The cyclic prefix is configured to occupy the guard interval 504, thus, the terms "guard interval" and "cyclic prefix" may be used interchangeably. The cyclic prefix is configured to facilitate triggering the FFT at the receiver. When the window 506 with tapered edges 508, 510 is applied to the OFDM symbol 502, in order to operate on the full useful ODFM symbol period, $T_U$, the taper 508 at the start of the window 506 may occupy a portion 514 of the guard interval 504 while the taper 510 at the end of the window 506 occupies a portion 516 of the OFDM symbol 502 period T. An effect of taper 510 is to reduce the amplitude of the useful symbol 502 in the taper region 516. Because of the cyclic nature of the FFT, an effective boxcar window may be produced by, e.g., overlapping and adding the FFT results corresponding to the initial taper 508 (i.e., region 514) with the FFT results corresponding to the end taper 510 (i.e., region 516). In other words, for the OFDM symbol, the tapered region 514 (i.e., the cyclic prefix occupying region 514) is equivalent to tapered region 516 (i.e., the portion of the OFDM symbol occupying region 516).

This is because of the cyclic prefix property, i.e., region 514 of the guard interval 504 includes a replication of region 516 of the OFDM symbol. Therefore, when the replication of the portion of the OFDM symbol included in the tapered region 514 is added to the portion of the OFDM symbol in the tapered region 516, the tapering cancels, and as a result a boxcar effective window is applied to the useful OFDM symbol 502. Interference, e.g., interference 308 of FIG. 3, does not have the cyclic prefix property and hence is windowed (including taper) within useful symbol duration 502. Further, the window length for interference is the full window length (i.e., $T_U$ plus $(T_G - \tilde{T}_G)$) which may be longer than $T_U$, but the overlap-add operation fits the entire window into $T_U$ interval.

To maximize the effects of the taper 508, 510 (i.e., minimize the spread of the external interferor), it is desirable to utilize as much of the guard interval 504 (i.e., as much of $T_G$) as possible for tapering. However, a purpose of the guard interval 504 is to reduce the effects of microreflection interference on the received OFDM symbol 502. If the guard interval 504 is fully utilized by the window 506 (including taper 508) then contributions from echoes may produce microreflection interference (i.e., ISI and ICI). To minimize the microreflection interference, it is desirable to utilize as much of the guard interval 504 (i.e., as much of $T_G$) as possible. In other words, to minimize microreflection interference, it is desirable for trigger point P to be relatively closer to useful OFDM symbol 502. Thus, utilizing the guard interval 504 to minimize microreflection interference conflicts with utilizing the guard interval 504 to minimize the effects of the external interferer 308 on the OFDM symbol processing.

A system and method consistent with the present disclosure are configured to optimize mitigating the micro-reflection interference (i.e., reducing or limiting a microreflection interference level) and mitigating the effects of the external interferer, utilizing the guard interval 504 (i.e., $T_G$). Referring again to FIG. 5, for example, if a delay of the furthest microreflection is less than $\tilde{T}'_G$, i.e., microreflection(s) may appear in the first region 512 of the guard interval, then a boxcar FFT may be triggered at any point in the second region 514 of the guard interval without introducing intersymbol or intercarrier interference due to microreflections. The second region 514, of duration $(T_G - \tilde{T}'_G)$, may then be used for tapering as shown in FIG. 5. In another example, the boxcar FFT may be triggered in a third region 518 that corresponds to a portion of the first region 512. Triggering the boxcar FFT in the third region 518 may introduce some intersymbol and intercarrier interference, but may allow a larger region 520 (i.e., of duration $T_G - \tilde{T}_G$, where $\tilde{T}_G < \tilde{T}'_G$) to be utilized for tapering. Utilizing the relatively larger region 520 (i.e., a guard interval remainder) may then mitigate and/or reduce further the effects of the external interferer when compared to the relatively smaller second region 514. The channel impulse response may be determined at the receiving device and, knowing the OFDM modulation, it is possible to identify a point within the guard interval 504 to trigger the boxcar FFT configured to provide a tolerable level of intersymbol and intercarrier interference. The remaining region (i.e., the guard interval remainder of duration $T_G - \tilde{T}_G$) within the cyclic prefix guard interval 504 may then be used for tapering.

Turning again to FIG. 3, head-end 302 and client device 306 may include respective optimization modules 324, 344 and respective windowing modules 328, 348. Respective memory 314, 334 are each configured to store respective reflection data 327, 347 and respective window data 329, 349. Optimization modules 324, 344 are configured to determine a guard interval remainder based, at least in part, on a comparison of an allowable microreflection interference level and an actual microreflection interference level. A first portion of the guard interval may then be utilized to mitigate interference from microreflections and the guard interval remainder may be utilized for window taper (i.e., to mitigate spectral spread from external interferors). In the following discussion, client device 306 corresponds to the receiving device and head-end 302 corresponds to the transmitting device. Of course, a similar description applies when head-end 302 is the receiving device and client device 306 is the transmitting device with client device optimization module 344 replaced by head-end optimization module 324, client device windowing module 348 replaced by head-end windowing module 328, etc.

Client device channel estimator module 342 is configured to determine a frequency response of channel 304. For example, client device channel estimator module 342 may be configured to estimate the channel frequency response based, at least in part, on one or more pilot signals included in a received OFDM symbol. The channel frequency response may typically be estimated to facilitate equalization, as described herein. Thus, in some embodiments, the channel frequency response may be available to the client device optimization module 344 initially. In other embodiments, the client device channel estimator module 342 may be configured to determine the channel frequency response estimate in response to a request from the client device optimization module 344. The IFFT module 338 may then be configured to determine a channel impulse response for channel 304, the channel impulse response based, at least in part, on the estimated channel frequency response. In some embodiments, a plurality of IFFTs may be performed and the magnitudes of the microreflections in the resulting respective channel impulse responses may be squared and averaged to reduce noise effects.

Figure 6:
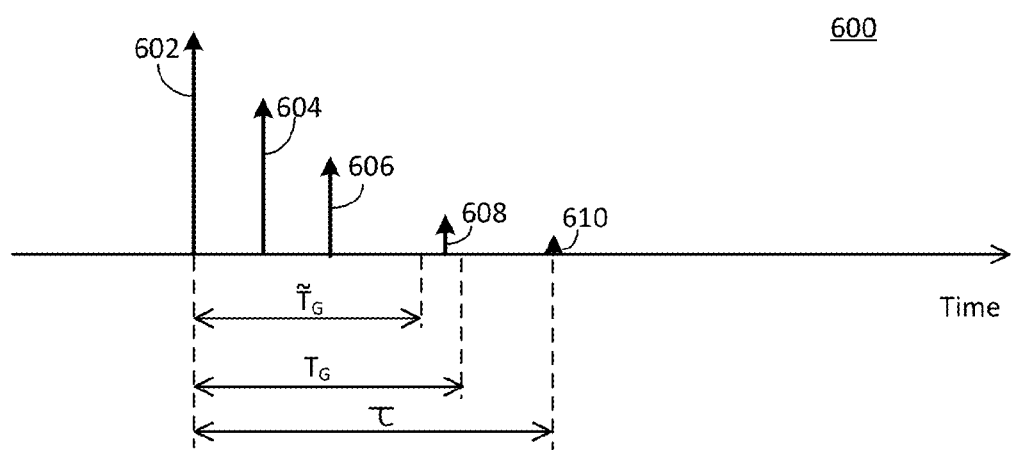
FIG. 6 illustrates an example of a portion of a channel impulse response consistent with one embodiment of the present disclosure.

FIG. 6 illustrates an example 600 of a portion of a channel impulse response (i.e., echo profile) where the horizontal axis corresponds to time. The echo profile 600 represents relative power levels and delays associated with the transmitted symbol and its associated microreflections. The example 600 includes a main symbol 602 (i.e., transmitted symbol) and a plurality of micro-reflections (i.e., echoes) 604, 606, 608, 610. The respective amplitude (representing power level) of each echo 604, 606, 608, 610 decreases as time increases, in this example 600. The respective strengths (i.e., power level) and delays of each micro-reflection 604, 606, 608, 610 may be determined from the IFFT. A duration $T_G$ corresponds to the duration $T_G$ of the guard interval 504 of FIG. 5 and a duration $\tilde{T}_G$ corresponds to the adjusted guard interval. Thus, echo 608 occurs within the guard interval $T_G$ but outside the adjusted guard interval $\tilde{T}_G$. Echo 610 is outside of the guard interval, $T_G$, and thus, will give rise to ISI and ICI (i.e., microreflection interference) that cannot be mitigated. However, the amount of microreflection interference due to echo 610 may be relatively small and thus, may be less than an allowable microreflection interference level.

In some embodiments, client device optimization module 344 may be configured to apply a threshold to the echo profile 600. The threshold is configured to exclude relatively small echoes that may not contribute significantly to the microreflection interference level. In other words, such relatively small microreflections may appear in the guard interval remainder 520, or in the time interval $T_U$ of FIG. 5. The optimization module 344 may be configured to determine an echo power $E_\tau$ and an echo delay $\tau$, i.e., a time interval between the start of the guard interval and the location of the associated echo for each echo 604, 606, 608, 610. For example, T in echo profile 600 corresponds to the echo delay of echo 610.

The client device optimization module 324 may then be configured to determine an actual microreflection interference level, i.e., the intersymbol and intercarrier interference due to microreflection, for one or more adjusted guard intervals $\tilde{T}_G$. Initially, $\tilde{T}_G$ may be set equal to the guard interval $T_G$ (i.e., zero guard interval remainder). Thus, a minimum actual microreflection interference level may be determined. The client device optimization module 344 may then be configured to compare the minimum actual microreflection interference level to an allowable microreflection interference level. If the minimum actual microreflection interference level is less than the allowable microreflection interference level, then at least some of the guard interval $T_G$ may be available for windowing. The client device optimization module 344 may then be configured to decrease $\tilde{T}_G$, determine the actual microreflection interference level and compare the minimum actual microreflection interference level to the allowable microreflection interference level. The process may repeat as long as the actual microreflection interference level is less than the allowable microreflection interference level. Eventually, the actual microreflection interference level may be greater than the allowable microreflection interference level. The adjusted guard interval duration $T_G$ may then be increased until the actual microreflection interference level is less than or equal to the allowable microreflection interference level. The remainder guard interval may then be determined as $T_G - \tilde{T}_G$.

For example, the client device optimization module 344 may be configured to determine an estimate of a respective contribution to microreflection interference for each echo that is outside the adjusted guard interval $\tilde{T}_G$ as:

$$ICI \approx ISI = \left(\frac{\tau - \tilde{T}_G}{T_U}\right) E_\tau$$

where $\tau$ is echo delay, $\tilde{T}_G$ is the adjusted guard interval duration, $T_U$ is OFDM useful symbol duration and $E_\tau$ is echo power. Thus, microreflection interference may result from a component of each echo $(\tau - \tilde{T}_G)$ that is outside the adjusted guard interval $\tilde{T}_G$. In this estimate, the contribution from inter-symbol interference is assumed to be approximately equal to the associated contribution from inter-carrier interference, thus the ISI and ICI (i.e., the actual microreflection interference level) for each echo is approximately $$2 * \left(\frac{\tau - \tilde{T}_G}{T_U}\right) E_\tau.$$

The contributions from each of the echoes outside the adjusted guard interval, e.g., echoes 608, 610 may be determined and summed to yield the actual microreflection interference level.

An allowable micro-reflection interference level (i.e., combination of ISI+ICI for the echoes) may be related to modulation technique, e.g., a particular QAM constellation. For example, each QAM constellation may have an associated maximum allowable micro-reflection interference level. Thus, client device optimization module 344 may be configured to determine the associated allowable micro-reflection level based on the particular QAM constellation. For example, reflection data 347 may include a look-up table configured to relate the allowable microreflection level to QAM constellation. In some embodiments, the allowable microreflection level may be provided as a signal to noise ratio (SNR). The optimization module 344 may be configured to determine an allowable microreflection level based, at least in part, on the provided SNR.

Client device optimization module 344 is configured to adjust $\tilde{T}_G$, determine the total ISI and ICI from echoes outside $\tilde{T}_G$ and compare the total ISI and ICI (i.e., the actual microreflection interference level) to the allowable micro-reflection interference level for the particular modulation technique. In some embodiments, the optimum $\tilde{T}_G$ may be determined by monitoring the resulting SNR, determined based, at least in part, on pilot sub-carrier(s). For example, the optimum $\tilde{T}_G$ may correspond to the minimum $\tilde{T}_G$ that provides an actual microreflection interference level that is below the allowable micro-reflection interference level. The remainder of the guard interval (i.e., $T_G - \tilde{T}_G$) may then be utilized for windowing.

Client device windowing module 348 may be configured to generate window data 349 based, at least in part, on the guard interval remainder. Client device windowing module 348 may then be configured to window each useful OFDM symbol, e.g., useful OFDM symbol 502, prior to client device FFT module 336 performing an FFT. Thus, interference effects from the external interferer 308 may be mitigated while preserving the SNR associated with microreflections.

For example, referring to FIG. 5 and FIG. 6 for illustrative purposes, assume an OFDM FFT size of 4096 covering a 204.8 MHz bandwidth with a symbol duration, $T_S$, of 20 μs (microsecond) and a maximum allowable micro-reflection interference level of −40.0 dB. Assume also a cyclic prefix (i.e., guard interval $T_G$) of 2.5 μs and one echo of strength −30 dB (decibels) corresponding to $E_\tau$ with a delay τ of 2.8 μs. If the entire guard interval $T_G$ can be used for cyclic prefix and FFT triggering, then the actual microreflection interference level can be calculated as approximately:

$$E_\tau(\text{in dB}) + 10 * \log_{10}\left(2 * \frac{\tau - T_G}{T_S}\right) \text{in dB}$$

or $$-30 + 10 * \log_{10}\left(2 * \frac{2.8 - 2.5}{20}\right) = -45.3 \text{ dB}$$

Since −45.3 dB is less than −40.0 dB (i.e., allowable microreflection interference level), the adjusted cyclic prefix interval $\tilde{T}_G$ may be less than $T_G$. For example, substituting $\tilde{T}_G$=1.8 μs for $T_G$ yields an actual microreflection interference level of −40.0 dB which meets the allowable micro-reflection interference level criterion. Thus, 0.7 μs (i.e., 2.5−1.8) may now be available for windowing. In operation, the trigger point for applying the window corresponds to 1.8 μs from the start of the guard interval $T_G$. The window may be applied by, e.g., client device windowing module 248, and an overlap-add operation may be performed. The FFT may then be triggered at the end of the guard interval $T_G$, corresponding to an optimal trigger point without windowing. Thus, the full length of the window ($T_U + (T_G - \tilde{T}_G)$) may be free of ISI due to the main path and ICI caused by the main path due to the windowing may be avoided, i.e., perfect reconstruction. The final trigger point for the FFT may correspond to an optimal trigger point for the no-window case and the no-window case resulted in an actual microreflection interference level of about −45 dB. Thus, minor changes in ICI and ISI levels, in the windowed case, for echoes outside the guard interval may not result in exceeding the −40 dB target. In other words, perfect reconstruction may be achieved with reference to the main path but not with reference to a relatively weak reflection with delay 2.8 μs. The relatively weak reflection may result in a microreflection interference level of −40 dB. Since an actual microreflection interference level of −40 dB does not exceed the allowable micro-reflection interference level, this relatively weak reflection may be deemed tolerable.

Figure 7:
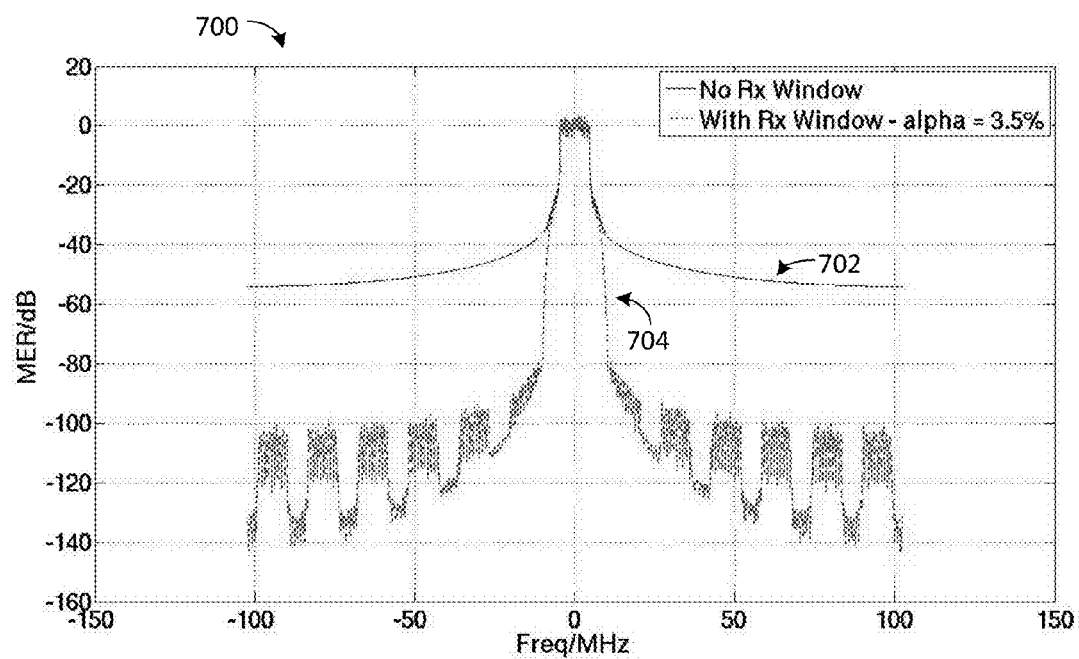
FIG. 7 illustrates a graph of modulation error ratio (MER) versus frequency for one example of a communications system consistent with the present disclosure.

FIG. 7 illustrates a graph 700 of modulation error ratio (MER) versus frequency for one example of a communications system consistent with the present disclosure, in the presence of an external interferer (e.g., LTE wireless signal). This example corresponds to an OFDM FFT size of 4096 covering a 204.8 MHz bandwidth with a symbol duration, $T_S$, of 20 μs, a cyclic prefix (i.e., guard interval $T_G$) of 2.5 μs and $\tilde{T}_G$=1.8 μs. Thus, a guard interval remainder of 0.7 μs (i.e., 2.5−1.8) of the guard interval $T_G$ was utilized for time domain windowing, as described herein. Plot 702 illustrates MER for OFDM symbols without time domain windowing. A relatively narrow band interferer results in significant spectral dispersion over the bandwidth of the OFDM system. Plot 704 illustrates MER for OFDM symbols with time domain windowing. The duration of the roll-off of the window edge corresponds to 0.7 μs divided by 20 μs, i.e., 3.5%. The spectral dispersion of plot 704 is significantly less than the spectral dispersion of plot 702. Thus, time domain windowing utilizing a portion of a guard interval (i.e., guard interval remainder) may reduce spectral dispersion of external interferers.

Thus, a portion of a guard interval (i.e., guard interval remainder) may be utilized for time domain windowing to reduce spectral dispersion of an external interferer. The guard interval remainder may be determined based, at least in part, on allowable microreflection interference level associated with a modulation technique for an OFDM symbol. The microreflection interference level may be limited and the spectral dispersion may then be mitigated by sharing the guard interval.

Figure 8:
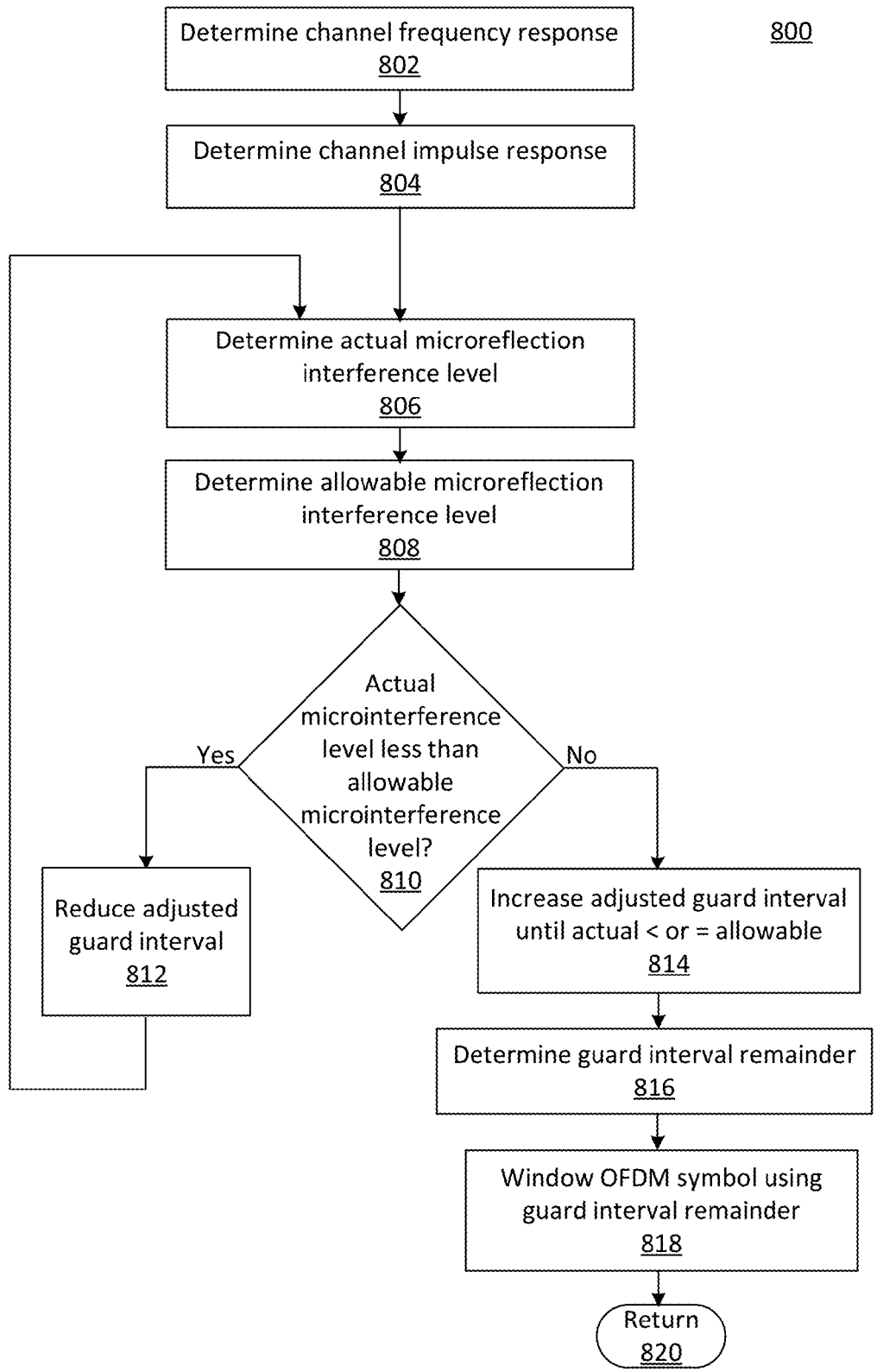
FIG. 8 is a flowchart of operations for mitigating interference according to various embodiments of the present disclosure.

FIG. 8 is a flowchart 800 of operations for mitigating interference according to various embodiments of the present disclosure. In particular, the flowchart 800 illustrates optimizing sharing a guard interval to provide windowing for mitigating spectral spread from external interferors and limiting a microreflection interference level. Operations of this embodiment may be performed by a head-end and/or a client device. Operations of this embodiment include determining a channel frequency response 802. Operation 804 includes determining a channel impulse response. The channel impulse response may be determined by performing an IFFT on the channel frequency response. An actual microreflection interference level may be determined at operation 806. The actual microreflection interference level is configured to include contributions from intersymbol interference and contributions from intercarrier interference. An allowable microreflection interference level may be determined at operation 808. The allowable microreflection interference level may depend on modulation technique. Whether the actual microreflection interference level is less than the allowable microreflection interference level may be determined at operation 810. If the actual microreflection interference level is less than the allowable microreflection interference level, then an adjusted guard interval may be reduced at operation 812 and program flow may return to operation 806. If the actual microreflection interference level is not less than the allowable microreflection interference level, then the adjusted guard interval may be increased until the actual microreflection interference level is less than or equal to the allowable microreflection interference level at operation 814. Operation 816 may include determining a guard interval remainder. For example, the guard interval remainder may correspond to a difference between the guard interval duration and the adjusted guard interval. Operations 818 may include windowing an OFDM symbol using the guard interval remainder. Program flow may then return at operation 820.

The operations of flowchart 800 are configured to determine a guard interval remainder based, at least in part, on a comparison of an allowable microreflection interference level and an actual microreflection interference level. The operations of flowchart 800 are further configured to window and OFDM symbol utilizing the guard interval remainder.

Figure 9:
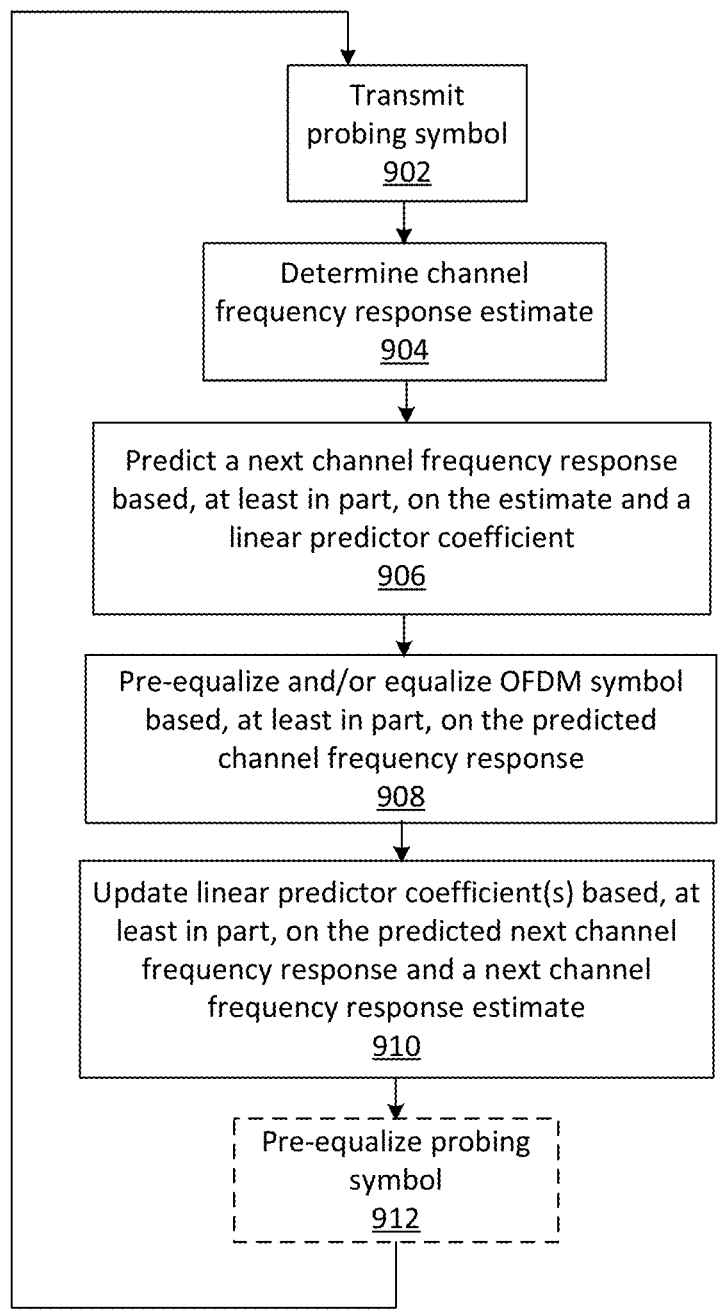
FIG. 9 is a flowchart of adaptive channel prediction operations according to various embodiments of the present disclosure.

FIG. 9 is a flowchart 900 of adaptive channel prediction operations according to various embodiments of the present disclosure. In particular, the flowchart 900 illustrates one example embodiment of operations of a communication system configured to pre-equalize and/or equalize an OFDM symbol based, at least in part, on a predicted channel characteristic, e.g., channel frequency response. Operations of this embodiment may be performed by a head-end and/or a client device. Operations of this embodiment include transmitting a probing symbol 902. For example, a client device may be configured to transmit a probing symbol in response to a request from a head-end. In some embodiments, the probing symbol may be pre-equalized prior to transmitting. A channel frequency response estimate may be determined based on the probing symbol at operation 904. Operation 906 may include predicting a next channel frequency response based, at least in part, on the channel frequency response estimate and a linear predictor coefficient. An OFDM signal may be pre-equalized and/or equalized based, at least in part, on the predicted channel frequency response at operation 908. The linear predictor coefficient may be updated based, at least in part, on the predicted next channel frequency response and a next channel frequency response estimate at operation 910. In some embodiments, at operation 912 a next probing symbol may be pre-equalized prior to transmitting. Program flow may then proceed to operation 902.

The operations of flowchart 900 are configured to determine a predicted channel characteristic based, at least in part, on a probing symbol and to equalize and/or pre-equalize an OFDM symbol based, at least in part, on the predicted channel characteristic.

While the flowcharts of FIGS. 8 and 9 illustrate operations according to various embodiments, it is to be understood that not all of the operations depicted in FIGS. 8 and/or 9 are necessary for other embodiments. In addition, it is fully contemplated herein that in other embodiments of the present disclosure, the operations depicted in FIGS. 8 and/or 9, and/or other operations described herein may be combined in a manner not specifically shown in any of the drawings, and such embodiments may include less or more operations than are illustrated in FIGS. 8 and/or 9. Thus, claims directed to features and/or operations that are not exactly shown in one drawing are deemed within the scope and content of the present disclosure.

The foregoing provides example system architectures and methodologies, however, modifications to the present disclosure are possible. For example, head-end 102 and/or client device(s) 106a, . . . , 106n may also include a host processor, chipset circuitry and system memory. The host processor may include one or more processor cores and may be configured to execute system software. System software may include, for example, an operating system. System memory may include I/O memory buffers configured to store one or more data packets that are to be transmitted by, or received by, head-end 102 and/or client device(s) 106a, . . . , 106n. Chipset circuitry may generally include "North Bridge" circuitry (not shown) to control communication between the processor, I/O circuitry and system memory.

The operating system (OS, not shown) may be configured to manage system resources and control tasks that are run on, e.g., head-end 102 and/or client device(s) 106a, . . . , 106n. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

The system memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage devices having stored thereon, individually or in combination, instructions that when executed by one or more processors perform the methods. The processor may include, for example, a processing unit and/or programmable circuitry in the I/O circuitry 312, 332 and/or other processing unit or programmable circuitry. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. "Module", as used herein, may comprise, singly or in any combination circuitry and/or code and/or instructions sets (e.g., software, firmware, etc.).

Communication systems (and methods), consistent with the teachings of the present disclosure are configured to provide adaptive channel prediction and/or mitigate interference in OFDM systems. In an embodiment, adaptive channel prediction is configured to predict and/or interpolate a channel frequency response between channel frequency response estimates that have been determined based on probing symbols. The predicted channel frequency response may then be utilized to pre-equalize and/or equalize OFDM symbols. The prediction and interpolation are configured to accommodate variation in the channel characteristics between estimates (i.e., between probing symbols).

In another embodiment, a communication system and method consistent with the present disclosure are configured to optimize sharing each guard interval associated with a respective received OFDM symbol. A first portion of the guard interval may be utilized for accommodating microreflections and a guard interval remainder may be utilized for tapering using, e.g., a raised cosine window. A duration of the first portion may be determined based, at least in part, on a modulation scheme, a channel impulse response and signal to noise ratio (SNR) specifications of the modulation scheme. A duration of the guard interval remainder may then be determined based on the size of the guard interval and the duration of the first portion. Windowing associated the with an FFT may then be performed at a receiving device with window edge tapering configured to reduce spectral spread associated with external interferers.

Accordingly, the present disclosure provides an example apparatus. The example apparatus includes an optimization module configured to determine a guard interval remainder based, at least in part on a comparison of an allowable microreflection interference level and an actual microreflection interference level; and a windowing module configured to window an OFDM (orthogonal frequency division multiplexed) symbol utilizing the guard interval remainder. The example apparatus may further include a channel estimator module configured to determine a predicted channel frequency response based, at least in part, on a probing symbol; and a pre-equalizer module configured to pre-equalize the OFDM symbol based, at least in part, on the predicted channel frequency response.

The present disclosure also provides an example method. The example method includes determining, by an optimization module, a guard interval remainder based, at least in part on a comparison of an allowable microreflection interference level and an actual microreflection interference level; and windowing, by a windowing module, an OFDM (orthogonal frequency division multiplexed) symbol utilizing the guard interval remainder. The example method may further include determining, by a channel estimator module, a predicted channel frequency response based, at least in part, on a probing symbol; and pre-equalizing, by a pre-equalizer module, or equalizing, by an equalizer module, or both pre-equalizing and equalizing, the OFDM symbol based, at least in part, on the predicted channel frequency response.

The present disclosure also provides an example system that includes one or more storage devices having stored thereon, individually or in combination, instructions that when executed by one or more processors result in the following operations including: determining a guard interval remainder based, at least in part on a comparison of an allowable microreflection interference level and an actual microreflection interference level; and windowing an OFDM (orthogonal frequency division multiplexed) symbol utilizing the guard interval remainder. The example system may further include determining a predicted channel frequency response based, at least in part, on a probing symbol; and pre-equalizing or equalizing or both pre-equalizing and equalizing, the OFDM symbol based, at least in part, on the predicted channel frequency response.

The present disclosure also provides an example system. The example system includes a transmitting device configured to transmit an OFDM (orthogonal frequency division multiplexed) symbol; and a receiving device, comprising: an optimization module configured to determine a guard interval remainder based, at least in part on a comparison of an allowable microreflection interference level and an actual microreflection interference level; and a windowing module configured to window a received OFDM symbol utilizing the guard interval remainder, the received OFDM symbol related to the transmitted OFDM symbol. The example transmitting device may further include a channel estimator module configured to determine a predicted channel frequency response based, at least in part, on a probing symbol. The example transmitting device may further include a pre-equalizer module configured to pre-equalize the transmitted OFDM symbol based, at least in part, on the predicted channel frequency response, or the receiving device may further include an equalizer module configured to equalize the received OFDM symbol or both.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus, comprising:
an optimization module configured to determine a guard interval remainder based, at least in part on a comparison of an allowable microreflection interference level and an actual microreflection interference level;
a windowing module configured to window an OFDM (orthogonal frequency division multiplexed) symbol utilizing the guard interval remainder;
a channel estimator module configured to determined a predicted channel frequency response based, at least in part, on a probing symbol; and
a pre-equalizer module configured to pre-equalize the OFDM symbol based, at least in part, on the predicted channel frequency response.

2. The apparatus of claim 1, wherein the optimization module is further configured to determine the allowable microreflection interference level based on a modulation technique associated with the OFDM symbol.

3. The apparatus of claim 1, wherein optimization module is further configured to determine the actual microreflection interference level based, at least in part, on a channel impulse response.

4. The apparatus of claim 1, wherein the pre-equalizer module is further configured to pre-equalize the probing symbol.

5. The apparatus of claim 1, wherein the predicted channel frequency response is time varying with non-time varying components removed.

6. A method, comprising:
determining, by an optimization module, a guard interval remainder based, at least in part on a comparison of an allowable microreflection interference level and an actual microreflection interference level;
windowing, by a windowing module, an OFDM (orthogonal frequency division multiplexed) symbol utilizing the guard interval remainder;

determining, by a channel estimator module, a predicted channel frequency response based, at least in part, on a probing symbol; and pre-equalizing, by a pre-equalizer module, or equalizing, by an equalizer module, or both pre-equalizer and equalizing, the OFDM symbol based, at least in part, on the predicted channel frequency resposnse.

7. The method of claim 6, further comprising: determining, by the optimization module, the allowable microreflection interference level based on a modulation technique associated with the OFDM symbol.

8. The method of claim 6, further comprising: determining, by the optimization module, the actual microreflection interference level based, at least in part, on a channel impulse response.

9. The method of claim 6, further comprising: pre-equalizing, by the pre-equalizer module, the probing symbol.

10. The method of claim 6, wherein the predicted channel frequency response is time varying with non-time varying components removed.

11. A system comprising, one or more non-transitory computer memories having stored thereon, individually or in combination, instructions that when executed by one or more processors result in the following operations comprising:

determining a guard interval remainder based, at least in part on a comparison of an allowable microreflection interference level and an actual microreflection interference level;

windowing an OFDM (orthogonal frequency division multiplexed) symbol utilizing the guard interval remainder;

determining a predicted channel frequency response based, at least in a part, on probing symbol; and pre-equalizer or equalizer or both pre-equalizer and equalizer, the OFDM symbol based, at least in part, on the predicted channel frequency response.

12. The system of claim 11, wherein the instructions that when executed by the one or more processors results in the following additional operations comprising: determining the allowable microreflection interference level based on a modulation technique associated with the OFDM symbol.

13. The system of claim 11, wherein the instructions that when executed by the or more processors results in the following additional operations comprising: determining the actual microreflection interference level based, at least in part, on a channel impulse response.

14. The system of claim 11, wherein the instructions that when executed by the one or more processors results in the following additional operations comprising: pre-equalizing the probing symbol.

15. The system of claim 11, wherein the predicted channel frequency response is time varying with non-time varying components removed.

16. A system comprising:
   a transmitting device configured to transmit an OFDM (orthogonal frequency division multiplexed) symbol;
   the transmitting device having:
      a channel estimator module configured to determine a predicted channel frequency response based, at least in part, on a probing symbol; and
   a receiving device, comprising:
      an optimization module configured to determine a guard interval remainder based, at least in part on a comparison of an allowable microreflection interference level and an actual microreflection interference level; and
      a windowing module configured to window a received OFDM symbol utilizing the guard interval remainder, the received OFDM symbol related to the transmitted OFDM symbol;
   wherein at least one of the transmitting device includes a pre-equalizer module configured to pre-equalize the transmitted OFDM symbol based, at least in part, on the predicted channel frequency response, or the receiving device includes an equalizer module configured to equalize the received OFDM symbol.

17. The system of claim 16, wherein the optimization module is further configured to determine the allowable microreflection interference level based on a modulation technique associated with the received OFDM symbol.

18. The system of claim 16, wherein optimization module is further configured to determine the actual microreflection interference level based, at least in part, on a channel impulse response.

19. The system of claim 16, wherein the pre-equalizer module is further configured to pre-equalize the probing symbol.

20. The system of claim 16, wherein the predicted channel frequency response is time varying with non-time varying components removed.

* * * * *